(12) United States Patent  (10) Patent No.: US 8,603,667 B1
Mano et al.  (45) Date of Patent: Dec. 10, 2013

(54) ELECTROCHEMICAL DEVICE

(71) Applicant: Taiyo Yuden Co., Ltd., Tokyo (JP)

(72) Inventors: Kyotaro Mano, Tokyo (JP); Naoto Hagiwara, Tokyo (JP); Katsuei Ishida, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 13/673,451

(22) Filed: Nov. 9, 2012

(30) Foreign Application Priority Data

Jun. 8, 2012 (JP) ................................. 2012-130400

(51) Int. Cl.
*H01M 2/00* (2006.01)
(52) U.S. Cl.
USPC .......................................................... 429/163
(58) Field of Classification Search
None
See application file for complete search history.

(56) References Cited

FOREIGN PATENT DOCUMENTS

| JP | 62-152423 U | 9/1987 |
|---|---|---|
| JP | 2006-012792 A | 1/2006 |
| JP | 2006-128080 A | 5/2006 |
| JP | 2006128080 | * 5/2006 |
| JP | 2008-211056 A | 9/2008 |
| JP | 2012-069508 A | 4/2012 |

OTHER PUBLICATIONS

Office Action dated Jul. 11, 2012 in Japanese Application No. 2012-136491, filed Jun. 18, 2012.

* cited by examiner

*Primary Examiner* — Patrick Ryan
*Assistant Examiner* — Christopher Domone
(74) *Attorney, Agent, or Firm* — Saliwanchik, Lloyd & Eisenschenk

(57) ABSTRACT

An electrochemical device includes a container, a storage element, and a structure. The container includes a container main body including a first inner surface, and a lid including a second inner surface opposed to the first inner surface. The lid is bonded to the container main body. The container contains an electrolyte. The storage element includes first and second electrode layers respectively adhered to the first and second inner surfaces and a separator provided between the first and second electrode layers to retain the electrolyte, and is sandwiched between the first and second inner surfaces. The structure is provided in at least either one of the first and second inner surfaces. The structure compresses and deforms the storage element to form, in an area of the separator sandwiched between the first and second electrode layers, a thin wall portion thinner than in a peripheral area around the area.

9 Claims, 10 Drawing Sheets

FIG.3
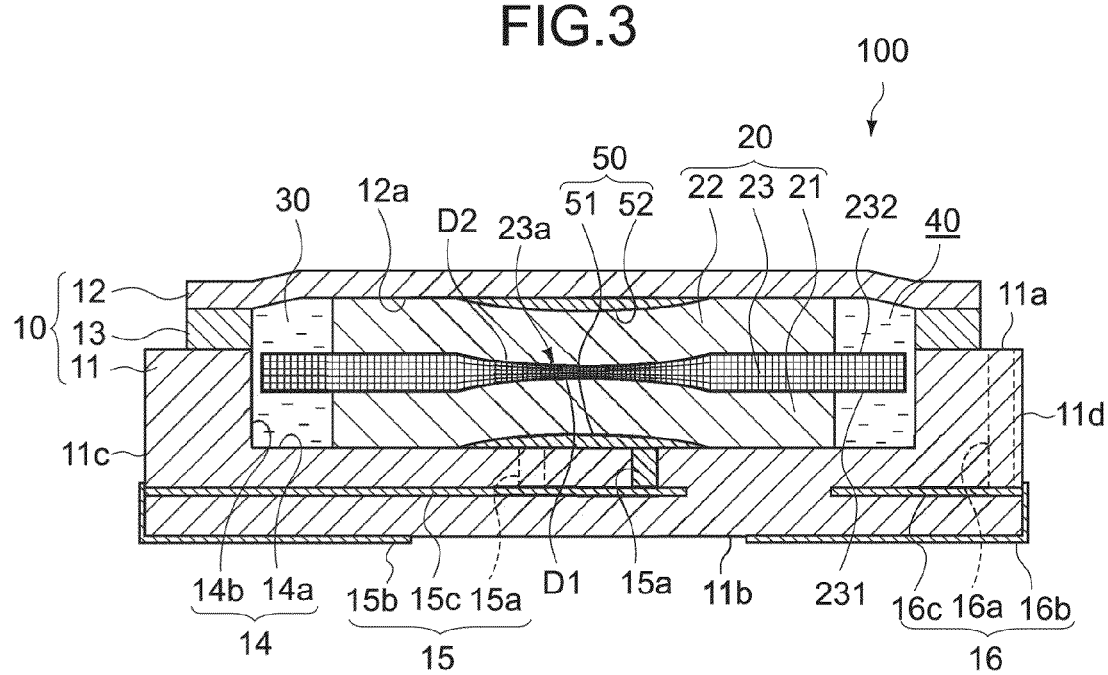
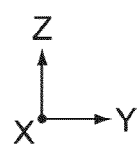

FIG.7
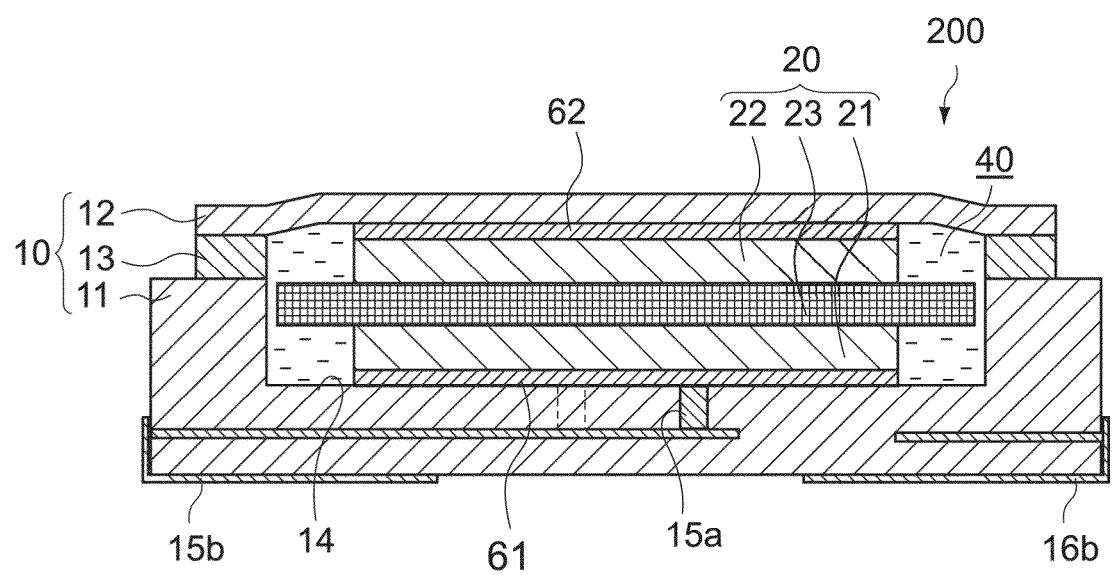
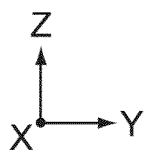

FIG.8
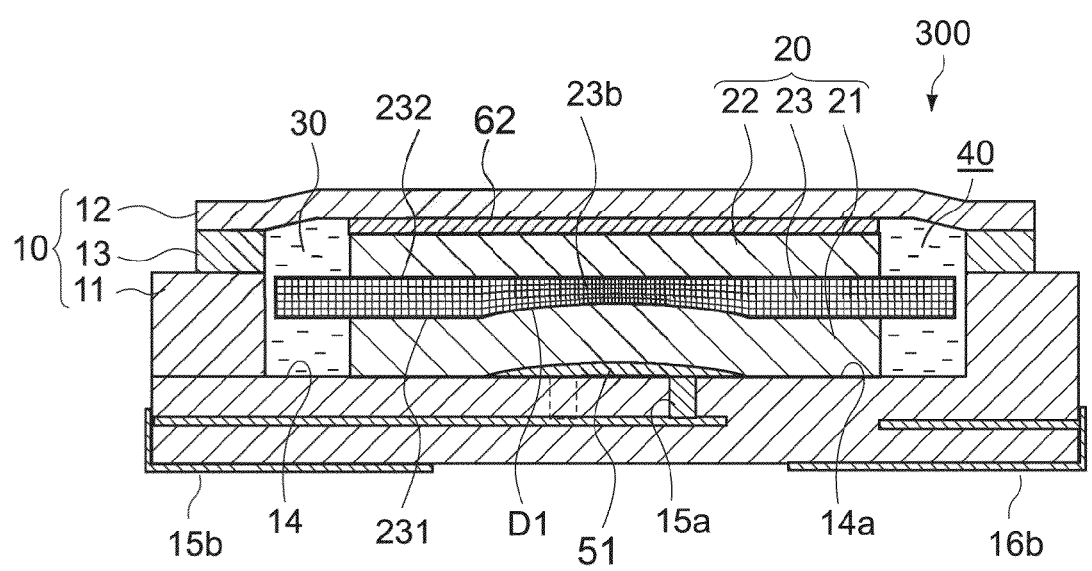
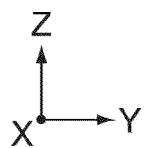

FIG.9
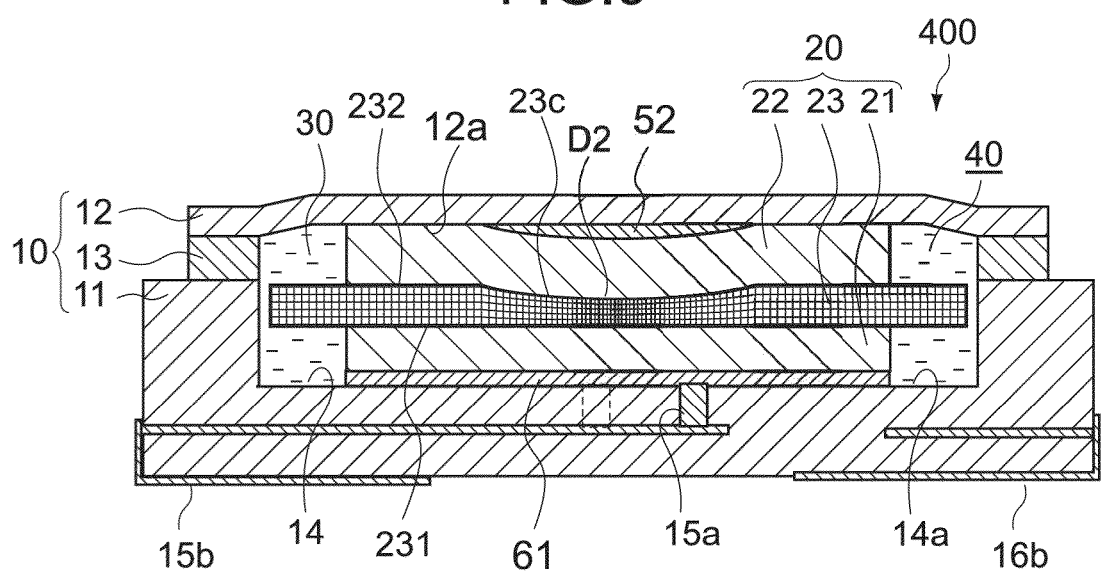
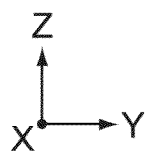

US 8,603,667 B1

ELECTROCHEMICAL DEVICE

CROSS-REFERENCE TO RELATED APPLICATION

This application claims the benefit under 35 U.S.C. §119 of Japanese Patent Application No. 2012-130400, filed Jun. 8, 2012, which is hereby incorporated by reference in its entirety.

BACKGROUND

The present disclosure relates to an electrochemical device including a built-in chargeable/dischargeable storage element.

In an electrochemical device, an electrolyte serves as a conduction path between positive and negative electrodes and as an ion supply source for capacitance generation. Therefore, lack of the electrolyte means malfunction of the electrochemical device. Thus, the electrochemical device needs to be structured to retain the electrolyte for a long time in order to enhance long-term reliability.

In general, the electrochemical device including the chargeable/dischargeable storage element is provided with a hermetically sealed container. The container houses, together with the electrolyte, the storage element including a positive electrode, a negative electrode, and a separator provided between the positive and negative electrodes.

For example, Japanese Patent Application Laid-open No. 2008-211056 (hereinafter, referred to as Patent Document 1) describes an electrochemical element including a container and a sealing plate having a projection that is to be fitted into an opening of the container. In this electrochemical element, the projection has a guide function, which facilitates positioning of the sealing plate with respect to the container. Therefore, when the sealing plate is seam-welded to the container, sealing properties are improved.

Meanwhile, Japanese Patent Application Laid-open No. 2006-128080 (hereinafter, referred to as Patent Document 2) describes an electric double-layer capacitor. The electric double-layer capacitor includes a substrate made of ceramic, which houses positive- and negative-electrode plates and an electrolyte, and a plate-like cover joined to the substrate. The substrate has a bottom surface warped so as to upward project and the cover is warped so as to downward project. In this electric double-layer capacitor, it is possible to securely fix inner components within the container.

BRIEF SUMMARY

However, in the configuration described in Patent Document 1, there is a fear that, when the sealing plate is joined to the opening of the container, the projection of the sealing plate may cause the electrolyte within the container to flow out around the container and the electrolyte may overflow to a surface joined to the sealing plate. In this case, welding workability is deteriorated, which leads to lower productivity. Also in the configuration described in Patent Document 2, due to the substrate and the cover warping, there is a fear that the electrolyte may overflow upon joining of the cover, which makes it difficult to ensure the productivity. However, if the amount of the electrolyte within the container is reduced in order to avoid such a problem, the duration of life of the element is shortened, which makes it difficult to ensure the long-term reliability.

In view of the above-mentioned circumstances, it is desirable to provide an electrochemical device capable of ensuring productivity and enhancing long-term reliability.

According to an embodiment of the present disclosure, there is provided an electrochemical device including a container, a storage element, and a structure.

The container includes a container main body including a first inner surface, and a lid that includes a second inner surface that is opposed to the first inner surface and is joined to the container main body, the container containing an electrolyte sealed therein.

The storage element includes a first electrode layer that is bonded to the first inner surface, a second electrode layer that is bonded to the second inner surface, and a separator that is provided between the first electrode layer and the second electrode layer to retain the electrolyte. The storage element is sandwiched between the first inner surface and the second inner surface.

The structure is provided in at least either one of the first inner surface and the second inner surface. The structure compresses and deforms the storage element to form, in an area of the separator that is sandwiched between the first electrode layer and the second electrode layer, a thin wall portion having a smaller thickness than in a peripheral area around the area.

These and other objects, features and advantages of the present disclosure will become more apparent in light of the following detailed description of best mode embodiments thereof, as illustrated in the accompanying drawings.

BRIEF DESCRIPTION OF THE DRAWINGS

FIG. 3 is a schematic cross-sectional view taken along the line [A]-[A] of FIG. 2;

FIG. 7 is a schematic cross-sectional side view of an electrochemical device according to a comparative example;

FIG. 8 is a schematic cross-sectional side view of an electrochemical device according to a second embodiment of the present disclosure;

FIG. 9 is a schematic cross-sectional side view of an electrochemical device according to a third embodiment of the present disclosure;

DETAILED DESCRIPTION

Figure 1:
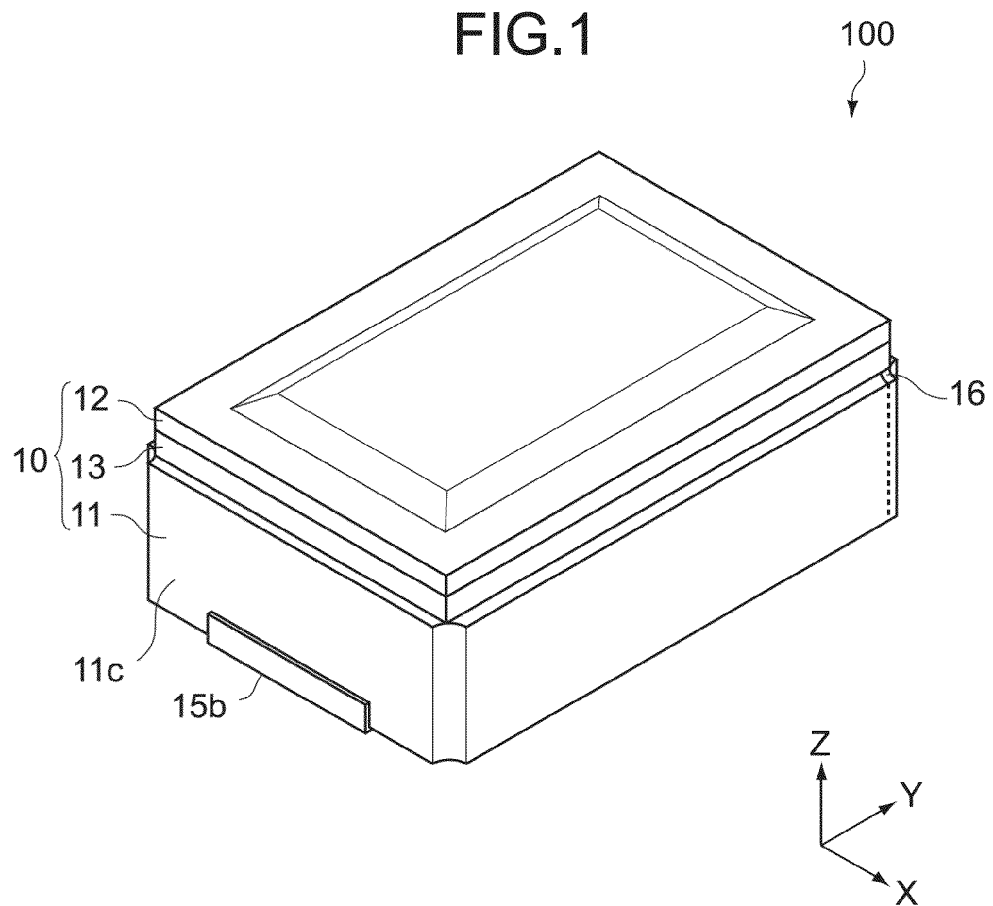
FIG. 1 is a perspective view showing an entire configuration of an electrochemical device according to a first embodiment of the present disclosure.

According to an embodiment of the present disclosure, there is provided an electrochemical device including a container, a storage element, and a structure.

The container includes a container main body including a first inner surface, and a lid that includes a second inner surface that is opposed to the first inner surface and is joined to the container main body, the container containing an electrolyte sealed therein.

The storage element includes a first electrode layer that is bonded to the first inner surface, a second electrode layer that is bonded to the second inner surface, and a separator that is provided between the first electrode layer and the second electrode layer to retain the electrolyte. The storage element is sandwiched between the first inner surface and the second inner surface.

The structure is provided in at least either one of the first inner surface and the second inner surface. The structure compresses and deforms the storage element to form, in an area of the separator that is sandwiched between the first electrode layer and the second electrode layer, a thin wall portion having a smaller thickness than in a peripheral area around the area.

In the electrochemical device, the structure compresses and deforms the storage element to form the thin wall portion in the separator. The thin wall portion of the separator has higher density than in other areas. Therefore, the electrolyte is collected into the thin wall portion due to capillary action and a larger amount of electrolyte is retained in the thin wall portion. Accordingly, for example, even when the amount of electrolyte within the container decreases due to decomposition of the electrolyte with long-time use, it is possible to collect the electrolyte into the thin wall portion of the separator, and hence to ensure a long-term stable operation of the device.

Further, the thin wall portion is formed with smaller thickness than in the peripheral area around the area of the separator that is sandwiched between the first electrode layer and the second electrode layer. Therefore, upon joining of the lid to the container main body, it is possible to reduce the amount of electrolyte flowing out of the area. Thus, it is possible to suppress entering and mixing of the electrolyte into a joining portion between the container main body and the lid. Therefore, it is possible to ensure stable joining workability and enhance production efficiency.

If the thin wall portion is formed in the peripheral area, the electrolyte easily flows to an outer peripheral side of the separator due to compression action upon assembling (sealing) of the device. In order to inhibit this, in the electrochemical device, the thin wall portion is formed at a position spaced from the peripheral area around the area.

The thin wall portion may be formed of a dimple provided in a surface of the separator. That is, the separator includes a first surface that is held in contact with the first electrode layer, and a second surface that is held in contact with the second electrode layer. The thin wall portion includes at least one dimple that is formed in at least one of the first surface and the second surface, the at least one dimple being spaced from the peripheral area.

Thus, the thin wall portion can gradually decrease in thickness toward a central portion thereof.

The structure is not particularly limited as long as the thin wall portion can be formed at a predetermined position of the separator. The structure may be provided in either one of the container main body (first inner surface) and the lid (second inner surface) or in the both.

The separator is not particularly limited as long as the separator is made of an insulating material having durability against the electrolyte and allowing ion migration between a positive-electrode layer and a negative-electrode layer. The separator may be formed of a porous material, a non-woven material, or the like. Typically, the separator is formed of a non-woven fabric containing a glass fiber. Thus, it is possible to easily adjust the density of the thin wall portion depending on a degree of compression.

Typically, island-shaped protrusions are provided in the first and the second inner surfaces to protrude toward the storage element. Due to the provision of the protrusions, the thin wall portion including the dimple can be formed in the sandwiched area of the separator.

The protrusion has a shape, width, height, hardness, and the like capable of locally compressing and deforming the storage element. Examples of the shape of the protrusion include a dome shape and a circular truncated cone shape. The height of the protrusion is set depending on, for example, the thickness of the separator. The protrusion favorably has conductivity, so that stable electrical connection is ensured between the inner surface of the container and the storage element.

The position at which the protrusion is formed is not particularly limited. Typically, the protrusion is provided so that the thin wall portion is formed in the central portion of the separator. Thus, the separator has, at a center thereof, a smaller thickness than at a peripheral portion. Therefore, it is possible to efficiently reduce the amount of electrolyte flowing around the separator upon the assembling.

The single protrusion or a plurality of protrusions may be formed in the first inner surface or the second inner surface. Thus, it is possible to form a plurality of thin wall portions in the separator and to stably retain the storage element within the container.

For example, the structure may include a first protrusion that protrudes from the first inner surface to the first electrode layer and is formed of a cured conductive adhesive. Thus, a trace of compression (dimple) by the first protrusion is formed in the separator via the first electrode layer. Therefore, the trace of compression can form the thin wall portion of the separator.

In this case, the container main body may further include a first terminal that is provided in the first inner surface to be electrically connected to the first electrode layer, a second terminal that is provided in an outer surface of the container main body, and a wiring portion that electrically connects the first terminal and the second terminal to each other. The first protrusion is partially formed in the first inner surface to cover the first terminal. Thus, the first terminal can be protected from the electrolyte.

Alternatively, the structure may further include a second protrusion that protrudes from the second inner surface to the second electrode layer and is formed of a cured conductive adhesive. Thus, a trace of compression (dimple) by the second protrusion is formed in the separator via the second electrode layer. Therefore, the trace of compression can form the thin wall portion of the separator.

Still alternatively, the structure may include a plurality of protrusions including the first protrusion and the second protrusion. Thus, a plurality of traces of compression are formed in the separator. The plurality of traces of compression can form the thin wall portion of the separator.

In this case, the first protrusion and the second protrusion may be provided to be opposed to each other in a thickness direction of the separator. Thus, it is possible to adjust the thickness of the thin wall portion of the separator, and hence to form the thin wall portion having a desired thickness.

Hereinafter, embodiments of the present disclosure will be described with reference to the drawings.

First Embodiment

Entire Configuration

Figure 2:
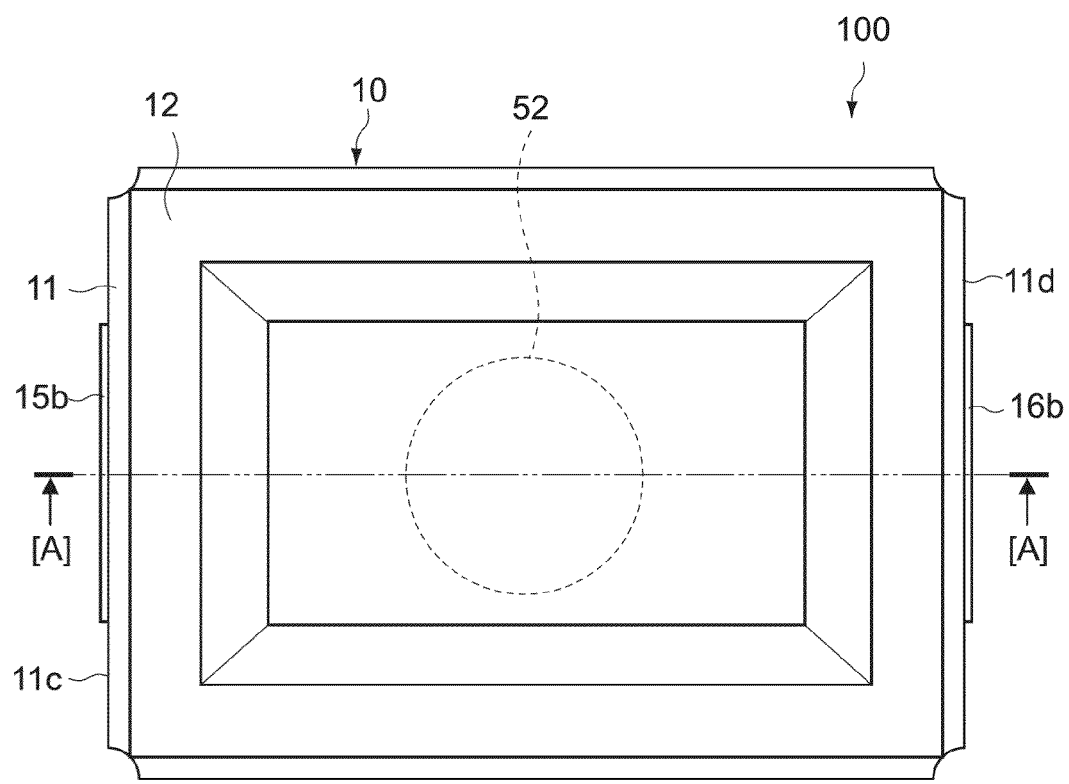
FIG. 2 is a plan view of the electrochemical device.

FIG. 1 is a perspective view showing an entire configuration of an electrochemical device according to a first embodiment of the present disclosure. FIG. 2 is a plan view of the electrochemical device. FIG. 3 is a schematic cross-sectional view taken along the line [A]-[A] of FIG. 2. In the figures, an X-axis, a Y-axis, a Z-axis indicate three axis directions orthogonal to one another.

An electrochemical device 100 according to the first embodiment has a width direction in an X-axis direction, a length direction in a Y-axis direction, and a height direction in a Z-axis direction. For example, the electrochemical device 100 has a width dimension of 2.5 mm along the X-axis direction, a length dimension of 3.2 mm along the Y-axis direction, and a height dimension of 0.9 mm along the Z-axis direction.

The electrochemical device 100 according to the first embodiment includes a container 10 and a storage element 20. The storage element 20 is sealed together with an electrolyte 30 within the container 10. The electrochemical device 100 is configured as a chargeable/dischargeable electric double-layer capacitor or secondary battery. The electrochemical device 100 is used as, for example, a back-up power supply of an electronic apparatus. The electrochemical device 100 is mounted on a circuit board of the electronic apparatus (not shown) by, for example, a reflow soldering method.

Container

The container 10 is formed in a cuboid shape and includes a container main body 11, a lid 12, and a seal ring 13. The container 10 is formed by joining the container main body 11 and the lid 12 to each other with the seal ring 13 being sandwiched therebetween.

Figure 4:
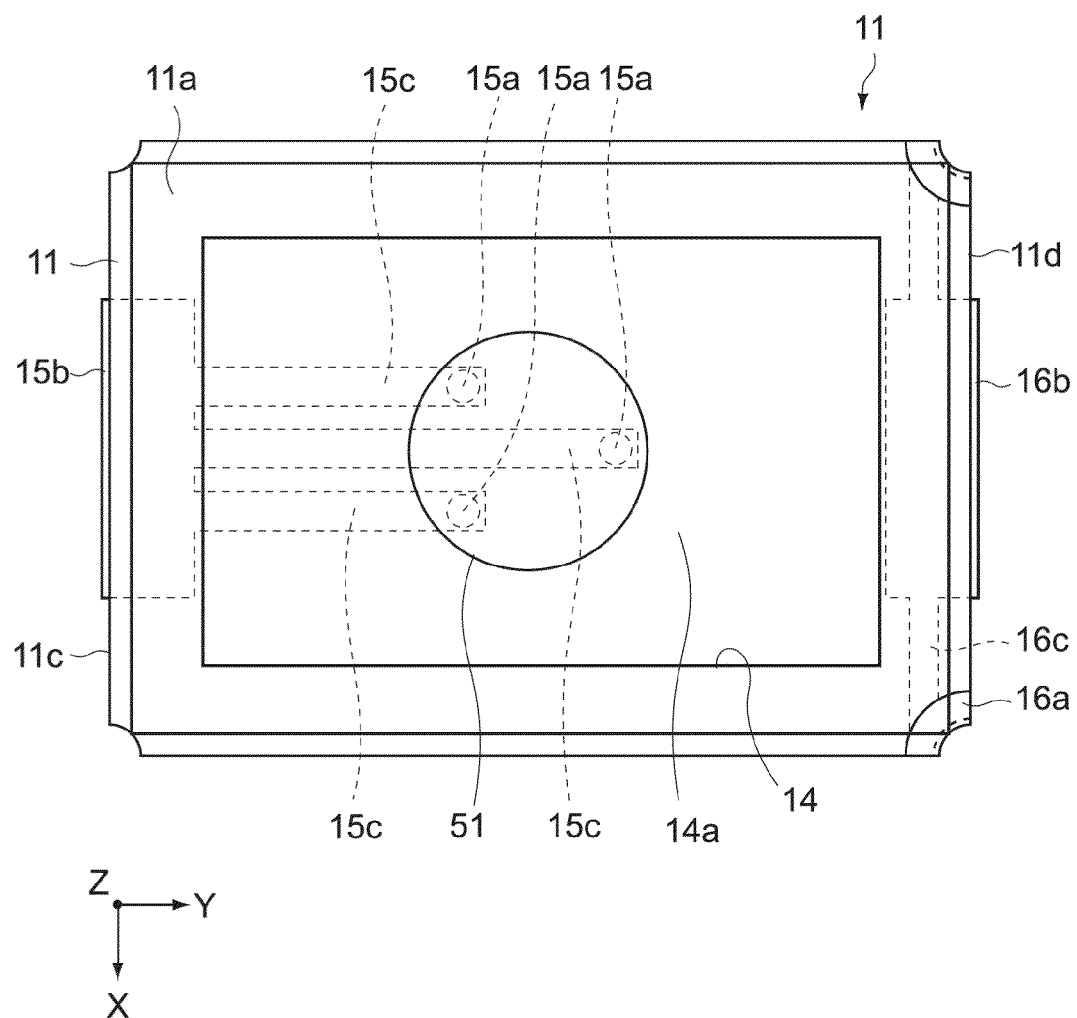
FIG. 4 is a plan view of a container main body of the electrochemical device.

FIG. 4 is a plan view of the container main body 11. The container main body 11 is made of an insulating material such as a ceramic and formed in an almost cuboid shape as a whole. As shown in FIG. 3, the container main body 11 includes an upper surface 11a in which a cuboid recess 14 is formed. The recess 14 includes a flat bottom surface 14a (first inner surface) and four side surfaces 14b. Covered with the lid 12, the recess 14 forms a liquid chamber 40 that houses the storage element 20 and the electrolyte 30.

The lid 12 is made of an almost-rectangular plate material that is joined to the upper surface 11a of the container main body 11 to cover the recess 14. The lid 12 is formed of a plate member including a flat inner surface 12a (second inner surface) that is opposed to the liquid chamber 40. For example, the lid 12 has a width dimension of 2.2 mm along the X-axis direction, a length dimension of 2.9 mm along the Y-axis direction, and a thickness dimension of 0.14 mm along the Z-axis direction.

In the first embodiment, the lid 12 has such a shape that four edge portions are lower than a central portion toward the container main body 11. However, the lid 12 may have such a shape that the central portion is lower than the edge portions toward the container main body 11 in contrast. Alternatively, the lid 12 may have such a flat shape that the edge portions are flush with the central portion.

The lid 12 is made of a conductive material such as various metals. For example, the lid 12 is made of kovar (Fe (iron)-Ni (nickel)-Co (cobalt) alloy). Alternatively, the lid 12 may be made of a clad material having a matrix of kovar or the like covered with a film made of a metal having high corrosion resistance such as Ni, Pt (platinum), Ag (silver), Au (gold), or Pd (palladium) in order to inhibit galvanic corrosion.

The seal ring 13 is formed of a metal ring member. The seal ring 13 is provided between the upper surface 11a of the container main body 11 and the lid 12 to surround the recess 14. The seal ring 13 is made of kovar similar to the lid 12. However, other metal materials may be used for the seal ring 13. The seal ring 13 is made of the same kind of material as that of the lid 12 or a material identical to that of the lid 12. Therefore, it is possible to reduce generation of thermal stress due to differences in coefficient of thermal expansion therebetween.

The lid 12 is joined to the container main body 11 via the seal ring 13 after the storage element 20 is placed in the recess 14 and the electrolyte 30 is injected into the recess 14. In this manner, the hermetically sealed liquid chamber 40 is formed within the container 10. The lid 12 is joined to the container main body 11 by a laser welding method. However, the laser welding method may be replaced by other welding techniques such as a seam welding method or other joining techniques.

The container main body 11 is manufactured by burning a plurality of laminated ceramic sheets. For example, the recess 14 is formed of a single ceramic sheet having an opening or formed by laminating one or more ceramic sheets each having an opening. The container main body 11 includes a positive-electrode wiring 15 and a negative-electrode wiring 16. The positive-electrode wiring 15 is electrically connected to a positive-electrode layer 21 of the storage element 20 housed in the liquid chamber 40. The negative-electrode wiring 16 is electrically connected to a negative-electrode layer 22 of the storage element 20.

The positive-electrode wiring 15 includes via-holes 15a (first terminal), an external positive-electrode terminal 15b (second terminal), and interlayer wiring portions 15c. The via-holes 15a are provided in the bottom surface 14a of the recess 14 to be electrically connected to the positive-electrode layer 21 of the storage element 20. The external positive-electrode terminal 15b is provided in an outer surface of the container main body 11. In the first embodiment, the external positive-electrode terminal 15b is formed from one side surface 11c to a lower surface 11b of the container main body 11.

The via-holes 15a are formed in the ceramic sheet constituting the bottom surface 14a of the recess 14. The external positive-electrode terminal 15b is formed in peripheral and bottom surfaces of the ceramic sheet forming a bottom portion of the container main body 11. The interlayer wiring portions 15c are formed between layers of the plurality of ceramic sheets. The via-holes 15a, the external positive-electrode terminal 15b, and the interlayer wiring portions 15c are made of a conductive material such as various metals. For example, the via-holes 15a, the external positive-electrode terminal 15b, and the interlayer wiring portions 15c are made of tungsten (W) or laminated films having tungsten (W) on which Ni, Au, or the like is formed.

The via-holes 15a are arranged in an almost central portion of the bottom surface 14a of the recess 14. One or more via-holes 15a may be provided. In the first embodiment, the via-holes 15a are formed at three positions almost in the center of the bottom surface 14a. The plurality of interlayer wiring portions 15c for each connecting the via-holes 15a to the external positive-electrode terminal 15b are provided. Note that, the interlayer wiring portions 15c may be formed of a single wiring portion common to the via-holes 15a.

The negative-electrode wiring 16 includes connection wiring portions 16a, an external negative-electrode terminal 16b, and an interlayer wiring portion 16c. The connection wiring portions 16a are electrically connected to the negative-electrode layer 22 of the storage element 20. The external negative-electrode terminal 16b is provided in the outer surface of the container main body 11. In the first embodiment, the external negative-electrode terminal 16b is formed from the other side surface 11d to the lower surface 11b of the container main body 11.

The connection wiring portions 16a are formed inside side walls of the container main body 11 to be electrically connected to the seal ring 13 provided on the upper surface 11a of the container main body 11. That is, the connection wiring portions 16a are electrically connected to the negative-electrode layer 22 via the seal ring 13, the lid 12, and a second protrusion 52, which will be described later. Instead of the connection wiring portions 16a, via-holes for connecting between the seal ring 13 and the external negative-electrode terminal 16b or the interlayer wiring portion 16c through the inside of the side walls of the container main body 11 may be formed. The connection wiring portions 16a, the external negative-electrode terminal 16b, and the interlayer wiring portion 16c are made of a conductive material such as various metals. For example, the connection wiring portions 16a, the external negative-electrode terminal 16b, and the interlayer wiring portion 16c are made of tungsten (W) or laminated films having tungsten (W) on which Ni, Au, or the like is formed.

Storage Element

The storage element 20 includes a positive-electrode layer 21 (first electrode layer), a negative-electrode layer 22 (second electrode layer), and a separator 23.

The positive-electrode layer 21 is formed of a sheet containing an active material. Examples of the active material include an active carbon and a polyacenic semiconductor (PAS). Hereinafter, the active material contained in the positive-electrode layer 21 is referred to as a positive-electrode active material. Electric double layers form a capacitor between the positive-electrode active material and the electrolyte and predetermined capacitance [F] generates. The capacitance of the positive-electrode layer 21 is defined by the product of the amount [g] of the positive-electrode active material, the surface area [m$^2$/g] of the positive-electrode active material, and the specific capacity [F/m$^2$] of the positive-electrode active material.

Specifically, the positive-electrode layer 21 is manufactured by rolling a mixture of positive-electrode active material particles (e.g., active carbon particles), a conductivity-imparting agent (e.g., ketjen black), and a binder (e.g., polytetrafluoroethylene (PTFE)) into a sheet and cutting the sheet in a predetermined size. The thus manufactured positive-electrode layer 21 can be suitably compressed and deformed by being sandwiched between the bottom surface 14a of the recess 14 and the inner surface 12a of the lid 12. As an example, the positive-electrode layer 21 is formed with a thickness of 0.2 mm.

The negative-electrode layer 22 is formed of a sheet containing an active material similar to the positive-electrode layer 21. Hereinafter, the active material contained in the negative-electrode layer 22 is referred to as a negative-electrode active material. The negative-electrode active material may be identical to the positive-electrode active material. Thus, if the positive-electrode active material is the active carbon, the negative-electrode active material may also be the active carbon. Also in the negative-electrode layer 22, electrolyte ions are adsorbed onto a surface of the negative-electrode active material and electric double layers are formed. The capacitance [F] of the negative-electrode layer 22 is also defined by the product of the amount [g] of the negative-electrode active material, the surface area [m$^2$/g] of the negative-electrode active material, and the specific capacity [F/m$^2$] of the negative-electrode active material. The negative-electrode active material is identical to the positive-electrode active material, and hence has the same specific capacity as that of the positive-electrode active material.

Similar to the positive-electrode layer 21, the negative-electrode layer 22 is also manufactured by rolling a mixture of negative-electrode active material particles (e.g., active carbon particles), a conductivity-imparting agent (e.g., ketjen black), and a binder (e.g., polytetrafluoroethylene (PTFE)) into a sheet and cutting the sheet in a predetermined size. The thus manufactured negative-electrode layer 22 can be suitably compressed and deformed by being sandwiched between the bottom surface 14a of the recess 14 and the inner surface 12a of the lid 12. As an example, the negative-electrode layer 22 is formed with a thickness of 0.2 mm.

The separator 23 is provided between the positive-electrode layer 21 and the negative-electrode layer 22. The separator 23 is made of an insulating material capable of retaining the electrolyte 30. The separator 23 is made of a porous material through which ions can pass in a thickness direction thereof. For example, the separator 23 is made of a polyolefin-based organic material or non-woven fabric. In the first embodiment, the separator 23 is made of a non-woven fabric containing glass fibers. However, the non-woven fabric containing glass fibers may be replaced by a non-woven fabric of another fiber material such as a cellulose fiber and a plastic fiber. The thickness of the separator 23 is not particularly limited. For example, the separator 23 has a thickness from 0.05 to 0.2 mm.

The separator 23 is formed in an almost rectangular shape larger than the positive-electrode layer 21 and the negative-electrode layer 22. The separator 23 includes a first surface 231 and a second surface 232. The first surface 231 is held in contact with the positive-electrode layer 21. The second surface 232 is held in contact with the negative-electrode layer 22. The separator 23 can be compressed and deformed in the thickness direction, and hence is housed in the liquid chamber 40 while being suitably compressed and deformed between the positive-electrode layer 21 and the negative-electrode layer 22. Thus, internal resistance between the positive-electrode layer 21 and the negative-electrode layer 22 is reduced.

The electrolyte 30 is not particularly limited. Any electrolyte material is applicable to the electrolyte 30. To the electrolyte 30, for example, a quaternary ammonium salt solution including $BF_4^-$ (tetrafluoroborate ion), more particularly, a 5-azoniaspiro[4.4]nonane-$BF_4$ or ethylmethylimidazolium-nonane-$BF_4$ solution is applicable.

Structure

The electrochemical device 100 according to the first embodiment includes a structure 50. The structure 50 compresses and deforms the storage element 20 to form, in an area of the separator 23 that is sandwiched between the positive-electrode layer 21 and the negative-electrode layer 22, a thin wall portion 23a having a smaller thickness than in a peripheral area around the area.

In the first embodiment, the structure 50 includes a first protrusion 51 and the second protrusion 52. The first protrusion 51 is provided in the bottom surface 14a of the recess 14. The second protrusion 52 is provided in the inner surface 12a of the lid 12.

The first protrusion 51 is formed in an island shape on the bottom surface 14a of the recess 14 to protrude from the bottom surface 14a to the storage element 20 (positive-electrode layer 21). The second protrusion 52 is formed in an island shape on the inner surface 12a of the lid 12 to protrude from the inner surface 12a to the storage element 20 (negative-electrode layer 22). The first and second protrusions 51 and 52 are made of a harder material than that of the positive-electrode layer 21 and the negative-electrode layer 22.

The first and second protrusions 51 and 52 compress and deform the storage element 20 in the thickness direction (Z-axis direction) within the liquid chamber 40 to form the thin wall portion 23a in the separator 23. In the first embodiment, the first and second protrusions 51 and 52 are provided in the bottom surface 14a of the recess 14 and the inner surface 12a of the lid 12, respectively, to be opposed to each other in the Z-axis direction. Therefore, the storage element 20 is, at both surfaces thereof, compressed and deformed by the first and second protrusions 51 and 52, so that the single thin wall portion 23a is formed in the separator 23.

The thickness of the thin wall portion 23a is not particularly limited. For example, the thin wall portion 23a has a thickness from 5 μm to 50 μm inclusive. In this case, a difference in thickness between the thin wall portion 23a and an outermost peripheral portion of the separator 23 is in a range of 10 μm to 150 μm inclusive, for example.

The first and second protrusions 51 and 52 are formed of a cured conductive adhesive. Accordingly, stable electrical connections between the positive-electrode layer 21 and the via-holes 15a and between the negative-electrode layer 22 and the lid 12 can be ensured.

The first protrusion 51 constitutes a positive-electrode adhesive layer that adheres and electrically connects the positive-electrode layer 21 and the bottom surface 14a of the recess 14 to each other. The first protrusion 51 is formed in a partial area between the bottom surface 14a of the recess 14 and the positive-electrode layer 21. In the first embodiment, as shown in FIG. 4, the first protrusion 51 is formed in a size to cover the three via-holes 15a. With this structure, the via-holes 15a are protected from corrosion due to contact with the electrolyte 30.

For the conductive adhesive forming the first protrusion 51, a synthetic resin material containing conductive particles is used. Those having high conductivity and chemical stability are favorably used as the conductive particles. For example, graphite particles are used as the conductive particles. One having a low degree of swelling in the electrolyte and high thermal resistance and chemical stability is favorably used as the synthetic resin material containing the conductive particles. For example, a phenol resin is used as the synthetic resin material containing the conductive particles.

The first protrusion 51 is formed in a circular dome shape. With this structure, the thin wall portion 23a can be stably formed in the separator 23 via the positive-electrode layer 21. The first protrusion 51 locally compresses the first surface 231 of the separator 23 via the positive-electrode layer 21 to form, in the first surface 231, a dimple D1 having a predetermined depth as a trace of compression. The dimple D1 is formed in the area of the separator 23 that is sandwiched between the positive-electrode layer 21 and the negative-electrode layer 22, the dimple D1 being spaced from the peripheral area around the area. In this manner, the dimple D1 forms a part of the thin wall portion 23a.

A method of forming the first protrusion 51 is not particularly limited. For example, various application methods such as a screen printing method and a potting method may be used. The first protrusion 51 is formed in the dome shape, and hence the thin wall portion 23a having a desired size can be formed without applying too large stress to the positive-electrode layer 21.

The height of the first protrusion 51 is not particularly limited and can be appropriately set depending on the height of the liquid chamber 40, the thickness and elastic modulus of the positive-electrode layer 21, the thickness of the thin wall portion 23a, and the like. For example, the first protrusion 51 has a height of 10 μm to 100 μm inclusive. If the height of the first protrusion 51 is smaller than 10 μm, it is difficult to form the thin wall portion 23a. If the height of the first protrusion 51 is larger than 100 μm, there is a fear that excess stress may be applied to the positive-electrode layer 21, which may damage the positive-electrode layer 21.

Meanwhile, the second protrusion 52 constitutes a negative-electrode adhesive layer that adheres and electrically connects the negative-electrode layer 22 and the inner surface 12a of the lid 12 to each other. The second protrusion 52 is formed in a partial area between the inner surface 12a of the lid 12 and the negative-electrode layer 22. Similar to the first protrusion 51, for the conductive adhesive forming the second protrusion 52, a synthetic resin material containing conductive particles is used. For the synthetic resin material, the same or a different kind of conductive adhesive as/from the conductive adhesive forming the first protrusion 51 can be used.

Similar to the first protrusion 51, the second protrusion 52 is also formed in a circular dome shape. With this structure, the thin wall portion 23a can be stably formed in the separator 23 via the negative-electrode layer 22. The second protrusion 52 locally compresses the second surface 232 of the separator 23 via the negative-electrode layer 22 to form, in the second surface 232, a dimple D2 having a predetermined depth as a trace of compression. The dimple D2 is formed in the area of the separator 23 that is sandwiched between the positive-electrode layer 21 and the negative-electrode layer 22, the dimple D2 being spaced from the peripheral area around the area. In this manner, the dimple D2 forms a part of the thin wall portion 23a.

A method of forming the second protrusion 52 is not particularly limited. For example, various application methods such as a screen printing method and a potting method may be used. The second protrusion 52 is formed in the dome shape, and hence the thin wall portion 23a having a desired size can be formed without applying too large stress to the negative-electrode layer 22.

The height of the second protrusion 52 is not particularly limited and can be appropriately set depending on the height of the liquid chamber 40, the thickness and elastic modulus of the negative-electrode layer 22, the thickness of the thin wall portion 23a, and the like. For example, the second protrusion 52 has a height of 10 μm to 100 μm inclusive. If the height of the second protrusion 52 is smaller than 10 μm, it is difficult to form the thin wall portion 23a. If the height of the second protrusion 52 is larger than 100 μm, there is a fear that excess stress may be applied to the negative-electrode layer 22, which may damage the negative-electrode layer 22.

In the first embodiment, the shape, size, and height of the second protrusion 52 are set to be the same as those of the first protrusion 51. However, the shape, size, and height of the second protrusion 52 are not limited thereto. For example, at least one of the shape, size, and height of the second protrusion 52 may be set to be different from that of the first protrusion 51.

Figure 5:
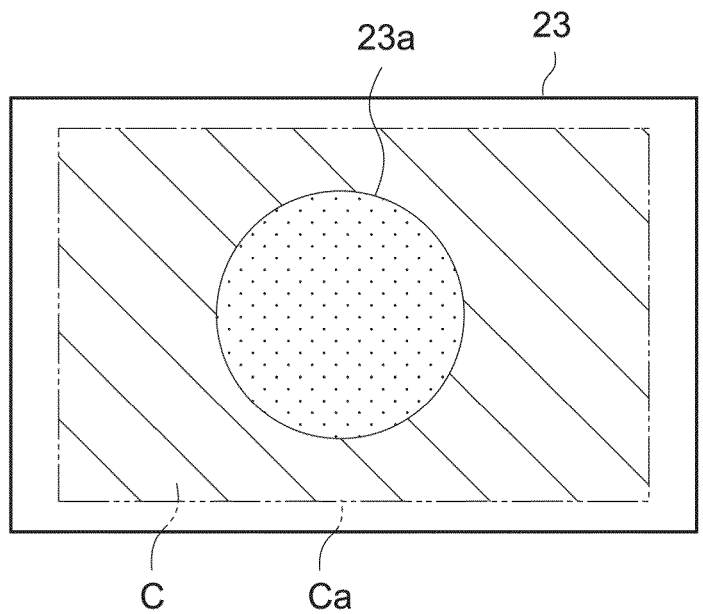
FIG. 5 is a schematic plan view of a separator forming a part of the electrochemical device, which shows an example of a thin wall portion formed in the separator.

FIG. 5 is a plan view of the separator 23 in which the thin wall portion 23a is formed. In the figure, an area C indicated by hatching represents the area of the separator 23 that is sandwiched between the positive-electrode layer 21 and the negative-electrode layer 22 and a dotted area shows the thin wall portion 23a. The first and second protrusions 51 and 52 are formed in the dome shape on the bottom surface 14a of the recess 14 and the inner surface 12a of the lid 12, respectively. As shown in FIG. 5, the first and second protrusions 51 and 52 form the thin wall portion 23a at positions spaced from a peripheral area Ca around the area C within the area C.

As described above, the thin wall portion 23a includes the dimple D1 and the dimple D2. The thin wall portion 23a is formed by being compressed and deformed by the first and second protrusions 51 and 52. Therefore, the thin wall portion 23a has a thickness smaller than that in the peripheral area Ca around the area C and gradually decreases in thickness toward the central portion corresponding to the shapes of the dimples D1 and D2.

Figure 6:
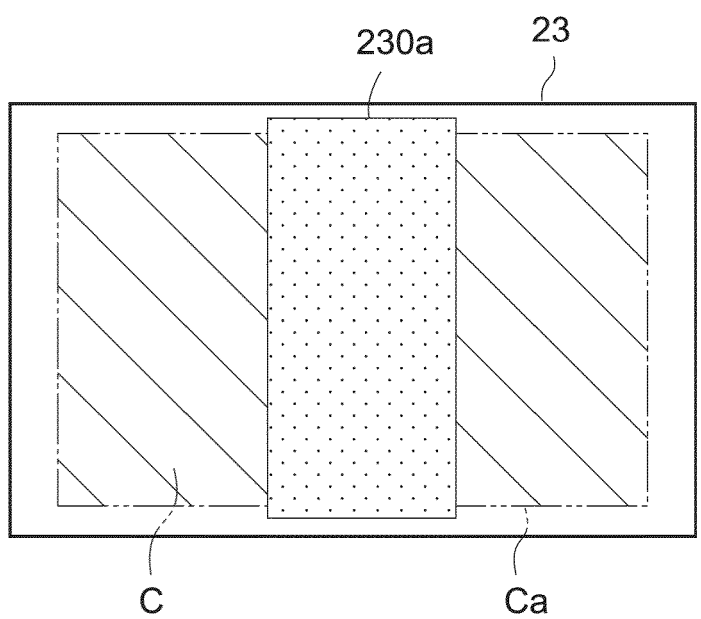
FIG. 6 is a plan view showing another example of the thin wall portion formed in the separator.

FIG. 6 shows an example in which the thin wall portion is formed also in the peripheral area around the area C. When a thin wall portion 230a is formed also in the peripheral area around the area C, the electrolyte soaking into the separator easily flows out around the separator due to the compression action by the structure upon assembling of the device.

As described above, the separator 23 is compressed by a predetermined amount in the thickness direction upon assembling (sealing). At this time, the thin wall portion 23a is compressed and deformed due to the provision of the first and second protrusions 51 and 52 more largely than other areas within the area C. However, the first and second protrusions 51 and 52 are provided at the positions spaced from the peripheral area Ca around the area C toward the center of the separator 23, and hence the amount of electrolyte flowing out of the area C when the thin wall portion 23a is formed can be suppressed.

Further, the separator 23 is formed of the non-woven fabric containing the glass fibers. Thus, the thin wall portion 23a has higher density than in the other areas of the separator 23. Therefore, the electrolyte 30 is collected into the thin wall portion 23a due to capillary action and a larger amount of electrolyte is retained therein. Accordingly, for example, even when the amount of electrolyte within the container 10 decreases due to decomposition of the electrolyte with long-time use, it is possible to collect the electrolyte into the thin wall portion 23a of the separator 23, and hence to ensure a long-term stable operation of the electrochemical device 100.

Actions of First Embodiment

FIG. 7 is a schematic cross-sectional side view of an electrochemical device 200 shown as a comparative example. In FIG. 7, parts corresponding to those in FIG. 3 are denoted by the same reference symbols and detailed description thereof will be omitted.

The electrochemical device 200 according to the comparative example has such a structure that a conductive adhesive layer 61 and a conductive adhesive layer 62 are in a flat shape. The conductive adhesive layer 61 adheres a recess 14 of a container main body 11 and a positive-electrode layer 21 to each other. The conductive adhesive layer 62 adheres a lid 12 and a negative-electrode layer 22 to each other. In the electrochemical device 200 having such a structure, the separator 23 has a uniform thickness in the liquid chamber 40, and hence, if the density or gaps of the separator 23 is/are uniform, distribution of the electrolyte retained by the separator 23 is also uniform. Therefore, decomposition and lack of the electrolyte uniformly occur in long-term use of the device. As a result, even when an amount of the electrolyte that allows conduction between positive- and negative-electrode layers 21 and 22 remains, if that electrolyte is uniformly distributed in the separator 23, there is a fear that the electrolyte may be insufficient.

In contrast, in the electrochemical device 100 according to the first embodiment, the thin wall portion 23a having higher density is formed in the central portion of the separator 23, and hence it is possible to ensure conduction between the positive- and negative-electrode layers 21 and 22 with a smaller amount of electrolyte in the thin wall portion 23a. In addition, the electrolyte 30 is supplied to the thin wall portion 23a due to capillary action. Therefore, even when the electrolyte is decomposed due to the long-term use of the device, the electrolyte 30 locally exists in the thin wall portion 23a. Thus, comparing the first embodiment and the comparative example with each other in the case of using a certain amount of electrolyte, according to the first embodiment, it is possible to operate the device for a longer term than with the electrochemical device 200 according to the comparative example.

Further, in the electrochemical device 200 according to the comparative example, when the container main body 11 and the lid 12 are joined to each other, the separator 23 is uniformly compressed and deformed. Accordingly, the electrolyte 30 soaking into the separator 23 isotropically flows out around the storage element 20. Therefore, when the device is welded and sealed, it is more likely that the electrolyte splashes outside and soaks into a welding surface or is mixed into a welding portion. The mixing of the electrolyte leads directly to welding failure and causes lower yield.

In contrast, in the electrochemical device 100 according to the first embodiment, an outer peripheral portion of the separator 23 retains a smaller amount of electrolyte 30 in comparison with the thin wall portion 23a in the center. Therefore, the outer peripheral portion of the separator 23 serves as a receiver for the electrolyte that flows out of the storage element 20 upon sealing with the lid 12. Accordingly, it is possible to suppress the splashing of the electrolyte and the mixing of the electrolyte into the welding portion, and hence to enhance the yield.

Second Embodiment

FIG. 8 is a schematic cross-sectional side view showing a configuration of an electrochemical device according to a second embodiment of the present disclosure. Hereinafter, components different from those of the first embodiment will be mainly described. Further, the same components as those of the above-mentioned embodiment will be denoted by the same reference symbols and description thereof will be omitted or simplified.

In an electrochemical device 300 according to the second embodiment, a separator 23 includes, in a central portion thereof, a thin wall portion 23b having higher density than in other areas. In the second embodiment, a structure that forms the thin wall portion 23b is constituted only by a protrusion 51. The protrusion 51 is provided between a recess 14 of a container main body 11 and a positive-electrode layer 21 of a storage element 20. The protrusion 51 forms a dimple D1 in a first surface 231 of the separator 23. The dimple D1 forms the thin wall portion 23b.

Corresponding to the first protrusion 51 in the above-mentioned first embodiment, the protrusion 51 has the same configuration, and hence description thereof will be omitted. Meanwhile, between the lid 12 and the negative-electrode layer 22, a conductive adhesive layer 62 that adheres and electrically connects the lid 12 and the negative-electrode layer 22 to each other is provided. The conductive adhesive layer 62 is formed of a flat layer formed over an entire surface in which the lid 12 and the negative-electrode layer 22 are opposed to each other.

Also in the thus configured second embodiment, upon sealing of a liquid chamber 40 with the lid 12, a trace of compression by the protrusion 51 is formed in the separator 23 via the positive-electrode layer 21, and hence that trace of compression can form the thin wall portion 23b of the separator 23. Accordingly, it is possible to provide the same action and effect as those of the first embodiment described above.

Third Embodiment

FIG. 9 is a schematic cross-sectional side view showing a configuration of an electrochemical device according to a third embodiment of the present disclosure. Hereinafter, components different from those of the first embodiment will be mainly described. Further, the same components as those of the above-mentioned embodiment will be denoted by the same reference symbols and description thereof will be omitted or simplified.

In an electrochemical device 400 according to the third embodiment, a separator 23 includes, in a central portion thereof, a thin wall portion 23c having density higher than in other areas. In the third embodiment, a structure that forms this thin wall portion 23c is constituted only by a protrusion 52. The protrusion 52 is provided between an inner surface 12a of a lid 12 and a negative-electrode layer 22 of a storage element 20. The protrusion 52 forms a dimple D2 in a second surface 232 of the separator 23. The dimple D2 forms the thin wall portion 23c.

Corresponding to the second protrusion 52 in the first embodiment described above, the protrusion 52 has the same configuration, and hence description thereof will be omitted. Meanwhile, between a positive-electrode layer 21 and via-holes 15a provided in a bottom surface 14a of a recess 14, a conductive adhesive layer 61 that adheres and electrically connects the positive-electrode layer 21 and the via-holes 15a to each other. The conductive adhesive layer 61 is formed of a flat layer formed over an entire surface in which the bottom surface 14a and the positive-electrode layer 21 are opposed to each other. Further, the conductive adhesive layer 61 covers the via-holes 15a to protect the via-holes 15a from corrosion due to contact with the electrolyte 30.

Also in the thus configured third embodiment, upon sealing of a liquid chamber 40 with the lid 12, a trace of compression by the protrusion 52 is formed in the separator 23 via the negative-electrode layer 22, and hence that trace of compression can form the thin wall portion 23c of the separator 23. Accordingly, it is possible to provide the same action and effect as those of the first embodiment described above.

Fourth Embodiment

Figure 10:
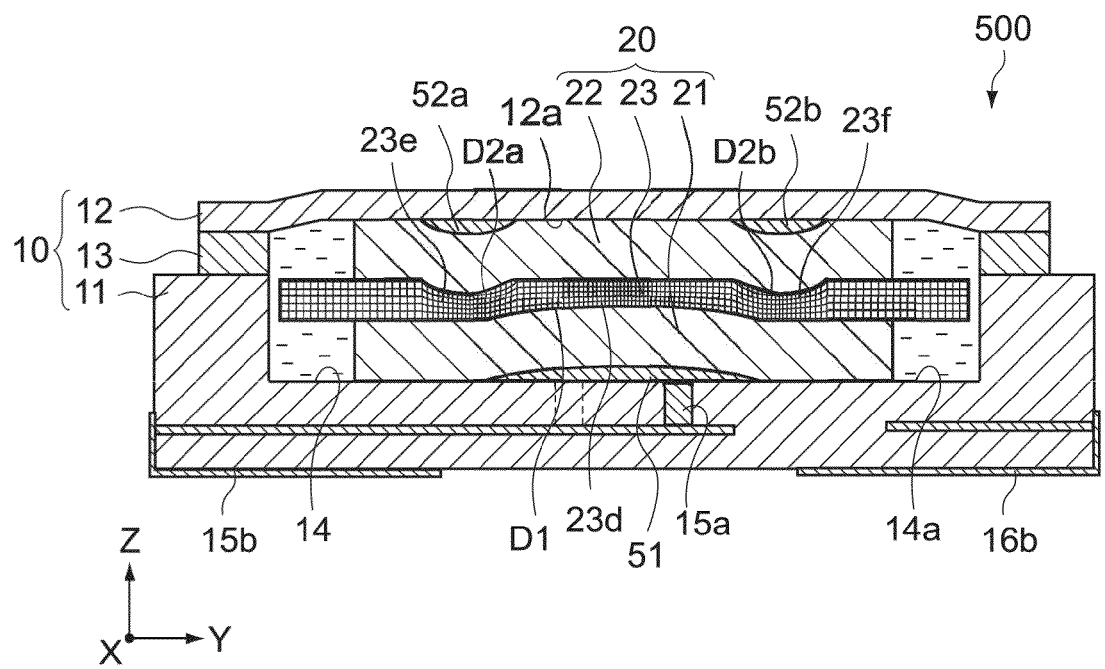
FIG. 10 is a schematic cross-sectional side view of an electrochemical device according to a fourth embodiment of the present disclosure.
Figure 11:
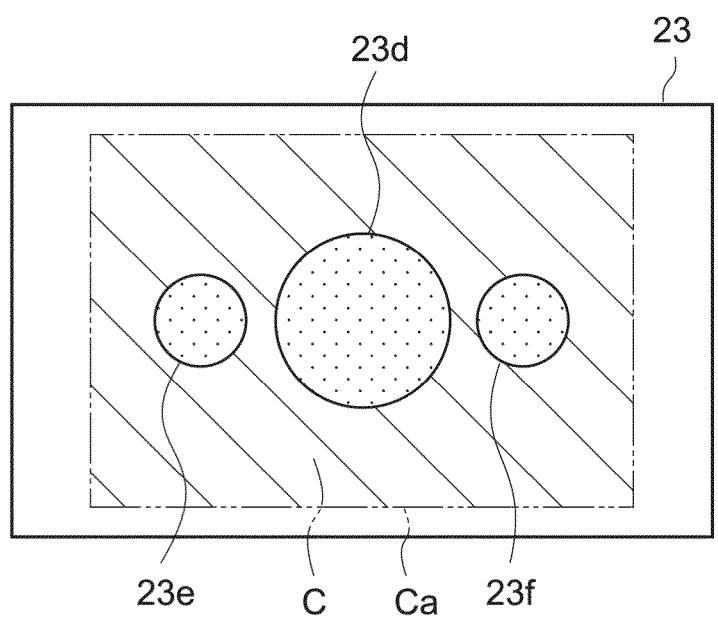
FIG. 11 is a schematic plan view of a separator forming a part of the electrochemical device shown in FIG. 10.

FIG. 10 is a schematic cross-sectional side view showing a configuration of an electrochemical device according to a fourth embodiment of the present disclosure. FIG. 11 is a schematic plan view of a separator 23 of the electrochemical device. Hereinafter, components different from those of the first embodiment will be mainly described. Further, the same components as those of the above-mentioned embodiment will be denoted by the same reference symbols and description thereof will be omitted or simplified.

An electrochemical device 500 according to the fourth embodiment is different from the above-mentioned embodiments in that a plurality of thin wall portions are formed in the separator 23. That is, in the fourth embodiment, the separator 23 includes a first thin wall portion 23d formed in a central portion thereof and second and third thin wall portions 23e and 23f formed sandwiching the first thin wall portion 23d therebetween. The first to third thin wall portions 23d to 23f are formed with higher density than in other areas of the separator 23.

The first thin wall portion 23d is formed by a first protrusion 51 provided in a bottom surface of a recess 14 of a container main body 11. The first thin wall portion 23d includes a dimple D1 opposed to the first protrusion 51. Meanwhile, the second and third thin wall portions 23e and 23f are formed by second and third protrusions 52a and 52b formed on an inner surface 12a of a lid 12, respectively. The second and third thin wall portions 23e and 23f includes dimples D2a and D2b opposed to the second and third protrusions 52a and 52b, respectively. The second and third protrusions 52a and 52b are formed of a cured conductive adhesive. The second and third protrusions 52a and 52b adhere and electrically connect the lid 12 and a negative-electrode layer 22 to each other.

The second and third protrusions 52a and 52b are arranged at such positions that the second and third protrusions 52a and 52b are not opposed to the first protrusion 51 in the Z-axis direction, the second and third protrusions 52a and 52b being separated from each other. Further, the second and third protrusions 52a and 52b are formed in a dome shape having smaller diameter than that of the first protrusion 51. As a result, the first thin wall portion 23d is different in position and size from the second and third thin wall portions 23e and 23f as shown in FIG. 11. Also in this case, the thin wall portions 23d, 23e, and 23f are formed at positions insulated from a peripheral area around an area C.

The shape, size, position of the first to third protrusions 51, 52a, and 52b are not particularly limited. The shape, size, position of the first to third protrusions 51, 52a, and 52b can be appropriately set depending on the position, size, number, and the like of thin wall portions to be formed.

Also in the fourth embodiment, it is possible to provide the same action and effect as those of the first embodiment described above. In particular, according to the fourth embodiment, the separator 23 includes the plurality of thin wall portions (23d to 23f), and hence it is possible to further reduce internal resistance and to distribute collection areas for the electrolyte to a plurality of positions. In addition, it is possible to more effectively suppress splashing of the electrolyte upon assembling (sealing). Thus, it is possible to achieve an enhancement in productivity.

Although the embodiments of the present disclosure has been described above, it is needless to say that the present disclosure is not limited to the above-mentioned embodiments and can be variously changed without departing the gist of the present disclosure.

For example, although, in the above-mentioned first embodiment, the first protrusion 51 and the second protrusion 52 are provided to be opposed to each other in the Z-axis direction, the first protrusion 51 and the second protrusion 52 may be provided not to be opposed to each other. With this structure, for example, it is possible to arbitrarily adjust the shape, size, thickness, and the like of the thin wall portion. Alternatively, either one of the first and second protrusions 51 and 52 may be constituted of a plurality of protrusions.

Further, although, in the above-mentioned second and third embodiments, the single protrusion 51 or the single protrusion 52 is provided, a plurality of protrusions 51 or a plurality of protrusions 52 may be provided. Further, in the above-mentioned fourth embodiment, a plurality of second protrusions 52a and a plurality of third protrusions 52b may be provided or a single annular protrusion may be provided as the second and third protrusions 52a and 52b.

In addition, although, in the above-mentioned embodiments, the positive-electrode layer 21 is provided to be opposed to the container main body 11 and the negative-electrode layer 22 is provided to be opposed to the lid 12, the positive-electrode layer 21 may be provided to be opposed to the lid 12 and the negative-electrode layer 22 may be provided to be opposed to the container main body 11 in contrast.

What is claimed is:

1. An electrochemical device, comprising:
a container including
a container main body including a first inner surface, wherein the first inner surface is flat, and
a lid including a second inner surface that is opposed to the first inner surface and being joined to the container main body, the container containing an electrolyte sealed therein, wherein the second inner surface is flat;
a storage element including
a first electrode layer that is bonded to the first inner surface, a second electrode layer that is bonded to the second inner surface, and
a separator that is provided between the first electrode layer and the second electrode layer to retain the electrolyte, the storage element being sandwiched between the first inner surface and the second inner surface; and
a structure that is provided in at least one of the first inner surface and the second inner surface, wherein the structure comprises at least one protrusion, and
wherein the structure compresses and deforms the storage element to form, in an inner area of the separator that is sandwiched between the first electrode layer and the second electrode layer, a thin wall portion having a smaller thickness than in a peripheral area around the inner area, and wherein the at least one protrusion of the structure includes a first protrusion that protrudes from the first inner surface to the first electrode layer and is formed of a cured conductive adhesive, and the at least one protrusion of the structure further includes a second protrusion that protrudes from the second inner surface to the second electrode layer and is formed of a cured conductive adhesive.

2. The electrochemical device according to claim 1, wherein the separator includes a first surface that is held in contact with the first electrode layer, and a second surface that is held in contact with the second electrode layer, and the thin wall portion includes at least one dimple that is formed in at least one of the first surface and the second surface, the at least one dimple being spaced from the peripheral area.

3. The electrochemical device according to claim 1, wherein the container main body further includes a first terminal that is provided in the first inner surface to be electrically connected to the first electrode layer, a second terminal that is provided in an outer surface of the container main body, and a wiring portion that electrically connects the first terminal and the second terminal to each other, and the first protrusion is partially formed in the first inner surface to cover the first terminal.

4. The electrochemical device according to claim 1, wherein the first protrusion and the second protrusion are provided to be opposed to each other in a thickness direction of the separator.

5. The electrochemical device according to claim 1, wherein the at least one protrusion of the structure includes a protrusion that protrudes from the second inner surface to the second electrode layer and is formed of a cured conductive adhesive.

6. The electrochemical device according to claim 1, wherein the thin wall portion is formed in a central portion of the separator.

7. The electrochemical device according to claim 1, wherein the structure is formed in a dome shape.

8. The electrochemical device according to claim 1, wherein the separator is formed of a non-woven fabric containing a glass fiber.

9. The electrochemical device according to claim 1, wherein the container is formed in a cuboid shape.

* * * * *